United States Patent
Takahashi et al.

(10) Patent No.: US 11,489,475 B2
(45) Date of Patent: Nov. 1, 2022

(54) POWER CONVERSION APPARATUS

(71) Applicant: DENSO CORPORATION, Kariya (JP)

(72) Inventors: Yoshimitsu Takahashi, Nisshin (JP); Makoto Taniguchi, Kariya (JP)

(73) Assignee: DENSO CORPORATION, Kariya (JP)

( * ) Notice: Subject to any disclaimer, the term of this patent is extended or adjusted under 35 U.S.C. 154(b) by 15 days.

(21) Appl. No.: 17/232,289

(22) Filed: Apr. 16, 2021

(65) Prior Publication Data

US 2021/0234491 A1 Jul. 29, 2021

Related U.S. Application Data

(63) Continuation of application No. PCT/JP2019/036592, filed on Sep. 18, 2019.

(30) Foreign Application Priority Data

Oct. 16, 2018 (JP) .............................. JP2018-195394

(51) Int. Cl.
| | |
|---|---|
| *H02P 27/06* | (2006.01) |
| *H02M 7/5387* | (2007.01) |
| *H02P 23/14* | (2006.01) |
| *H02P 25/22* | (2006.01) |

(52) U.S. Cl.
CPC ........ *H02P 27/06* (2013.01); *H02M 7/53871* (2013.01); *H02P 23/14* (2013.01); *H02P 25/22* (2013.01)

(58) Field of Classification Search
CPC combination set(s) only.
See application file for complete search history.

(56) References Cited

U.S. PATENT DOCUMENTS 8,234,028 B2 * 7/2012 Yamaguchi ........... B60W 10/06
701/22

FOREIGN PATENT DOCUMENTS

| | | |
|---|---|---|
| JP | S64-34198 A | 2/1989 |
| JP | 2009-189181 A | 8/2009 |
| WO | 2018/117084 A1 | 6/2018 |
| WO | 2018/180360 A1 | 10/2018 |

OTHER PUBLICATIONS

Dec. 3, 2019 International Search Report issued in International Patent Application No. PCT/JP2019/036592.

* cited by examiner

*Primary Examiner* — Antony M Paul
(74) *Attorney, Agent, or Firm* — Oliff PLC

(57) ABSTRACT

The present disclosure provides a power conversion apparatus converting a power from a DC power source, supplying the converted power to a rotary electric machine to drive the rotary electric machine. The power conversion apparatus according to the present disclosure includes: a first inverter circuit electrically connected to a first end of each of phase winding, transmitting power between respective phase windings and the DC power source; a second inverter circuit electrically connected to a second end each of phase winding, transmitting power between respective phase windings and the DC power source; and a control unit controlling the first inverter circuit and the second inverter circuit. The control unit is configured to change a total amount of current flowing through respective phase windings depending on a rotational speed of the rotary electric machine.

6 Claims, 4 Drawing Sheets

POWER CONVERSION APPARATUS

CROSS REFERENCE TO RELATED APPLICATION

This application is the U.S. bypass application of International Application No. PCT/JP2019/036592 filed on Sep. 18, 2019, which designated the U.S. and claims priority to Japanese Patent Application No. 2018-195394, filed Oct. 16, 2018, the contents of both of these are incorporated herein by reference.

BACKGROUND

Technical Field

The present disclosure relates to power conversion apparatus.

Description of the Related Art

As conventional art, an inverter (power conversion apparatus) for performing current control of a motor is known. In such an inverter, there is a technique in which a star-connection operation and a delta-connection operation are switched to drive the motor, to suppress starting current when starting the motor.

SUMMARY

The present disclosure provides a power conversion apparatus converting a power from a DC power source, supplying the converted power to a rotary electric machine to drive the rotary electric machine. The power conversion apparatus according to the present disclosure includes: a first inverter circuit electrically connected to a first end of each phase winding, transmitting power between respective phase windings and the DC power source; a second inverter circuit electrically connected to a second end of each phase winding, transmitting power between respective phase windings and the DC power source; and a control unit controlling the first inverter circuit and the second inverter circuit. The control unit is configured to change a total amount of current flowing through respective phase windings depending on a rotational speed of the rotary electric machine.

BRIEF DESCRIPTION OF THE DRAWINGS

The foregoing and other objects, features, and advantages of the present disclosure will be more clarified by the following detailed descriptions with reference to the accompanying drawings.

In the accompanying drawings.

DETAILED DESCRIPTION OF THE PREFERRED EMBODIMENTS

As conventional art, an inverter (power conversion apparatus) for performing a current control of a motor is known. In such an inverter, there is a technique in which a star-connection operation and a delta-connection operation are switched to drive the motor, to suppress starting current when starting the motor. For example, Japanese Patent Application Laid-Open Publication No. 1989-34198 discloses an inverter provided with two pairs of three-phase bridge circuits in which the positive terminal and the negative terminal of one three-phase bridge circuit are connected to the positive terminal and the negative terminal of the power source respectively, and the positive terminal and the negative terminal of the other three-phase bridge circuit are connected to the positive terminal and the negative terminal of the power source respectively via a switch. By turning the switch ON and OFF, star-connection operation or delta-connection operation is selected. In such an inverter, a star-delta starting method is performed, whereby starting current can be suppressed when starting the motor.

Considering a case where the motor is utilized for a starter motor of an engine (ISG), torque of the motor is desired to be larger when starting the motor. In other words, when starting the engine, the larger the torque of the motor (i.e. torque applied to the crank shaft), the shorter the time to start the engine is. Accordingly, the starting torque is desired to be larger. However, according to the above-described inverter, a problem arises that the torque when starting becomes smaller similar to the start current.

Hereinafter, with reference to the drawings, embodiments of the present disclosure in which a power conversion apparatus of the present disclosure is applied to a driving system of a vehicle provided with an engine and a rotary electric machine as a power source for driving will be described.

Embodiment

Figure 1:
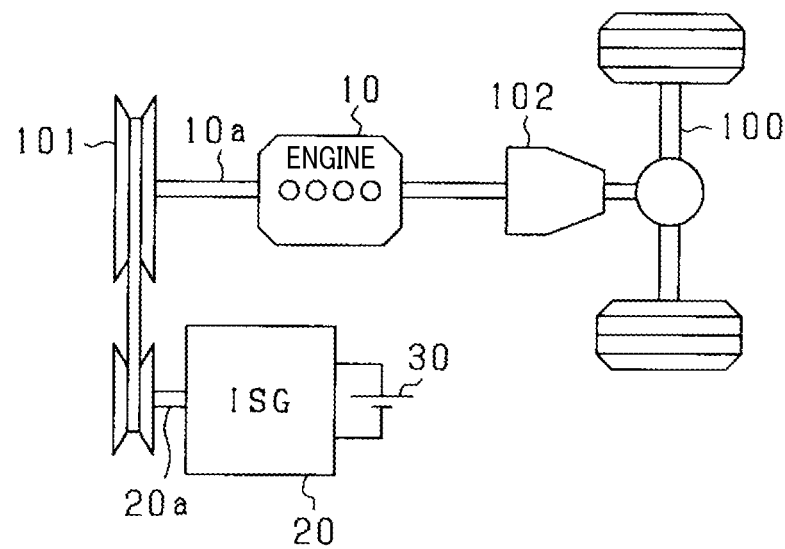
FIG. 1 is a conceptual diagram showing a driving system of the present disclosure.

As shown in FIG. 1, the vehicle is provided with an engine 100, an ISG 20 and a battery 30 as a DC power source. According to the present embodiment, the ISG 20 is a generator having a motor function, provided with a motor 40 as a rotary electric machine, an inverter 50 as a power conversion apparatus, a control unit 60 as a control unit. The ISG 20 is configured as mechanically-electrically integrated ISG (i.e. integrated starter generator).

Specifically, the motor 40 is a permanent magnet type synchronous machine having a three-phase winding. Note that the motor 40 may be configured as a field winding synchronous machine. A rotary shaft 20*a* of the ISG 20 (i.e. the rotary shaft 20*a* of the motor 40) is coupled to a crank shaft 10*a* of the engine 10 via a coupling mechanism 101 such as a pulley, thereby transmitting the driving force to the crank shaft 10*a*. The crank shaft 10*a* of the engine 10 is coupled to an axle 100 via a coupling mechanism 102 such as a transmission. The ISG 20 includes a power generation function performing power generation (regenerative power generation) with rotation of the crank shaft 10*a* of the engine 10 and the axle 100, and a power running function applying a driving force (rotational force) to the crank shaft 10*a*. Further, the ISG 20 includes a function of a motor (starter) applying an initial rotational force to the crank shaft 10*a*.

The battery 30 uses a secondary battery capable of being charged or discharging, that is, lithium ion storage battery.

Subsequently, with reference to FIG. 2, an electrical configuration of a driving system will be described.

Figure 2:
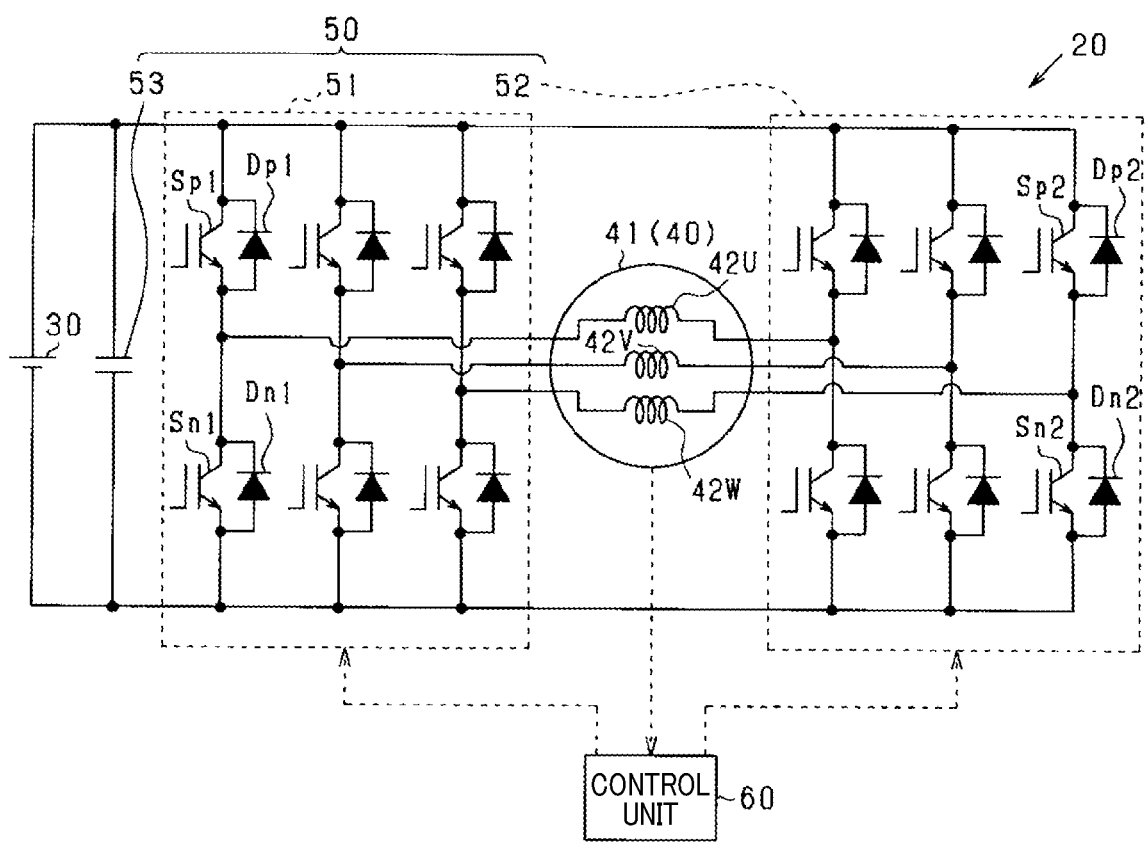
FIG. 2 is a circuit diagram showing an electrical configuration of an ISG.

In FIG. 2, a three-phase winding 41 as a stator winding of the motor 40 is shown. The three-phase winding is composed of a U-phase winding 42U, a V-phase winding 42V and a W-phase winding 42W. According to the present embodiment, the U-phase winding 42U, the V-phase winding 42V and the W-phase winding 42W are arranged such that respective phases are shifted from each other by 120 degrees of electrical angle.

The inverter 50 is provided with a first inverter circuit 51, a second inverter circuit 52 and a smoothing capacitor 53. According to the present embodiment, a three-phase inverter is utilized for the first and second inverters 51 and 52. A battery 30 and a capacitor 53 are connected in parallel to each of the first and second inverters 51 and 52.

The first and second inverters 51 and 52 are each configured by a full-bridge circuit having upper and lower arms provided for each phase of the three-phase winding 41. The switches (semiconductor switching elements) provided for each phase are switched between ON and OFF, thereby adjusting energization current at the respective phase windings (i.e. U phase winding 42U, V phase winding 42V and W phase winding 42W).

In more detail, the first inverter circuit 51 is provided with a series-connected body composed of an upper arm switch Sp1 and a lower arm switch Sn1 in the for each of three phases constituted of U phase, V phase and W phase. According to the present embodiment, as the upper arm switch Sp1 and the lower arm switch Sn1, voltage-controlled type semiconductor switches are used, that is, IGBTs. Note that MOSFETs may be used. For the upper arm switch Sp1 and the lower arm switch Sn1 in the respective phases, free-wheel diodes (i.e. reflux diode) Dp1 and Dn1 are connected in parallel thereto, respectively.

The high voltage side terminal (collector) of the upper arm switch Sp1 in respective phases is connected to the positive terminal of the battery 3. The low voltage side terminal (emitter) of lower arm switch Sn1 in respective phases is connected to the negative terminal (ground) of the battery 30. First ends of the U phase winding 42U, the V phase winding 42V and the W phase winding 42W are each connected to an intermediate connection point between the upper arm switch Sp1 and the lower arm switch Sn1 in respective phases.

In other words, the first end of the U phase winding 42U is connected to the intermediate connection point between the upper arm switch Sp1 and the lower arm switch Sn1 in the U phase. The first end of the V phase winding 42V is connected to the intermediate connection point between the upper arm switch Sp1 and the lower arm switch Sn1 in the V phase. The first end of the W phase winding 42W is connected to the intermediate connection point between the upper arm switch Sp1 and the lower arm switch Sn1 in the W phase.

The second inverter circuit 52 is configured to have a similar configuration to the first inverter circuit 51. That is, the second inverter circuit 52 is provided with the series-connected body composed of the upper arm switch Sp2 and the lower arm switch Sn2 in each phase winding. For the upper arm switch Sp2 and the lower arm switch Sn2 in the respective phases, free-wheel diodes Dp2 and Dn2 are connected in parallel thereto, respectively.

The high voltage side terminal (collector) of the upper arm switch Sp2 in respective phases is connected to the positive terminal of the battery 3. The low voltage side terminal (emitter) of lower arm switch Sn2 in respective phases is connected to the negative terminal (ground) of the battery 30. Second ends of the U phase winding 42U, the V phase winding 42V and the W phase winding 42W are each connected to an intermediate connection point between the upper arm switch Sp2 and the lower arm switch Sn2 in respective phases.

In other words, the second end of the U phase winding 42U is connected to the intermediate connection point between the upper arm switch Sp2 and the lower arm switch Sn2 in the U phase. The second end of the V phase winding 42V is connected to the intermediate connection point between the upper arm switch Sp2 and the lower arm switch Sn2 in the V phase. The second end of the W phase winding 42W is connected to the intermediate connection point between the upper arm switch Sp2 and the lower arm switch Sn2 in the W phase.

The control unit 60 includes a microprocessor composed of a CPU and various memory units and performs an energization control by an ON-OFF control of respective switches in the first and second inverters 51 and 52, based on various detection information of the ISG 20 and requests of power running drive and power generation. The detection information of ISG 20 includes, for example, a rotational angle (electrical angle information) of a rotor (rotational shaft 20a) of the motor 40, a power source voltage (inverter input voltage) detected by a voltage sensor, and energization current in respective phases detected by the current sensor. The rotational speed of the rotor is detected by an angle detection unit as a positional detection unit such as a resolver. The control unit 60 generates an operation signal for operating the respective switches in the first and second inverters 51 and 52 and outputs them. Note that the request of the power generation is a request of the regenerative driving.

The control unit 60 is communicably connected to an engine ECU that controls an engine which is not shown. The control unit 60 outputs, when the engine ECU transmits a power running drive request (including engine start request), the operation signal for operating respective switches and controls the ISG 20 so as to apply a torque to the crank shaft 10a of the engine 10. The control unit 60, when the power generation request is transmitted, controls the ISG 20 by outputting the operation signal for operating the respective switches to convert the generation power, thereby charging the battery 30.

Note that the engine ECU performs a starting operation of the engine 10 in response to an ignition switch (not shown) being turned ON by a vehicle driver, and transmits an engine start request based on a releasing operation of an idle-stop state or the like. Also, the engine ECU controls fuel injection and ignition operation or the like. The engine ECU outputs information based on a signal outputted by the crank sensor to the control unit 60. The crank angle sensor is provided in the vicinity of the crank shaft 10a. The crank angle sensor detects a crank angle of the crank shaft 10a, and outputs an engine rotational speed signal depending on the detected crank angle to the engine ECU. In other words, the engine ECU outputs information about the rotational speed of the engine 10 (i.e. engine speed) to the control unit 60.

In the case where a starting operation of the engine 10 is performed, a starting period from a start timing of the starting operation (at a time of request) to a completion timing (at a time of stable ignition) may preferably be as short as possible. Hence, the output torque of the ISG 20 (motor 40) when starting the engine 10 may preferably be as large as possible. However, generally, when increasing the output torque, the size of the motor 4 tends to be larger. Hence, considering accommodation space, a weight and a manufacturing cost of the ISG 20, there is a limit for increasing the output torque by increasing the size of the motor 40.

Figure 3:
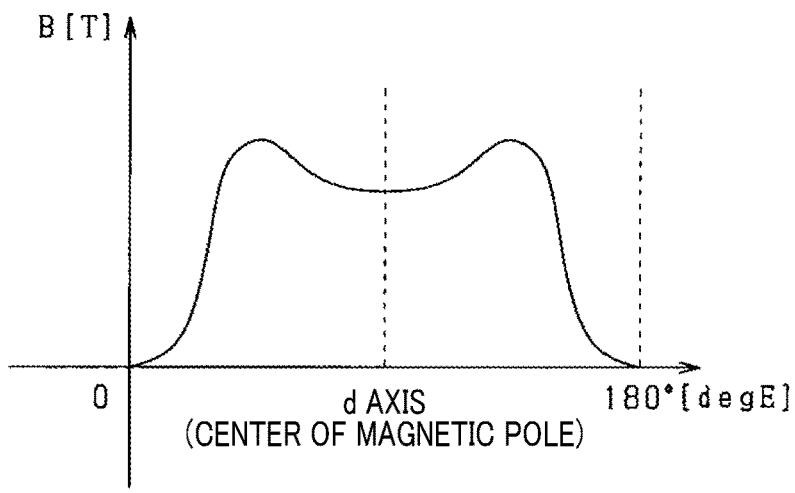
FIG. 3 is a graph showing a distribution of a magnetic flux density.

On the other hand, as shown in FIG. 3, the magnetic density distribution of the permanent magnet as field magnet generally contains higher harmonic components (third order harmonic or fifth order harmonic) other than the fundamental wave. Hence, these higher harmonics may be superposed on current flowing through respective phase windings, whereby high harmonic components in the magnetic flux density distribution of the permanent magnet is effectively utilized to enhance the output torque. However, in the case where higher harmonic higher harmonics are superposed on the respective phase current, since torque ripple and eddy current loss become larger, preferably, higher harmonics are superposed for a constant period from the start timing of the starting process. In this respect, when starting the engine, the control unit 60 executes a control, which will be described with reference to FIG. 4 in the following.

Figure 4:
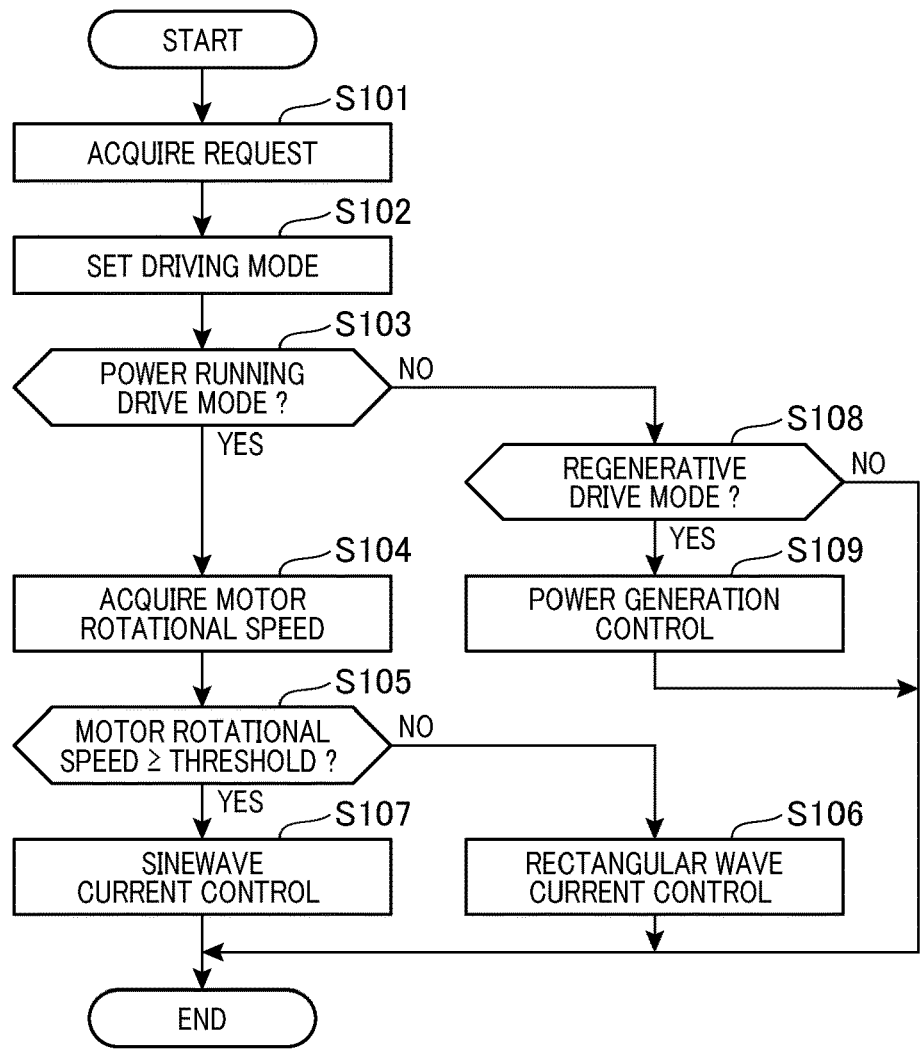
FIG. 4 is a flowchart showing a motor control process.

FIG. 4 is a flowchart showing a motor control process executed by the control unit 60. The motor control process is executed at each predetermined period.

The control unit 60 acquires a power running drive request or a power generation request from the engine ECU or the like (step S101). Next, the control unit 60 sets a driving mode based on the acquired request (step S102). For example, when the power running drive request (including engine start request) is acquired, a regenerative drive mode is set. In the case where neither of the power running drive request nor the power generation request are acquired, the process sets a stop mode.

Next, the control unit 60 determines whether the power running drive mode is set (step S103). When the determination result of step S103 is affirmative, the control unit 60 acquires a rotational speed of the motor 40 (herein after referred to as a motor rotational speed) (step S104). The motor rotational speed is calculated based on the rotational angle (electrical angle information) of the rotary shaft 20*a* detected by an angle detection unit such as resolver. As the motor rotational speed, rotational frequency (r.p.m) of the motor 40 may be employed. Further, since the rotational shaft 20*a* and the crank shaft 10*a* are coupled with each other, the engine speed (engine rotational speed) may be acquired instead.

Next, the control unit 60 determines whether the motor rotational speed is larger than or equal to a threshold (step S105). The threshold will be described later.

When the determination result at step S105 is negative, the control unit 60 executes rectangular wave current control that supplies rectangular wave current to the respective phase windings (step S106). That is, when the motor rotational speed is slow and a large torque is required (determination result at step S105 is negative), the respective switches (Sp1, Sn1, Sp2, Sn2) are controlled to supply the current superposing higher harmonics on the fundamental wave. Specifically, the control unit 60 controls the respective switches (Sp1, Sn1, Sp2, Sn2) such that total amount of current flowing through the respective phase windings is not 0 (zero). Thus, higher harmonics can be superposed.

Figure 5:
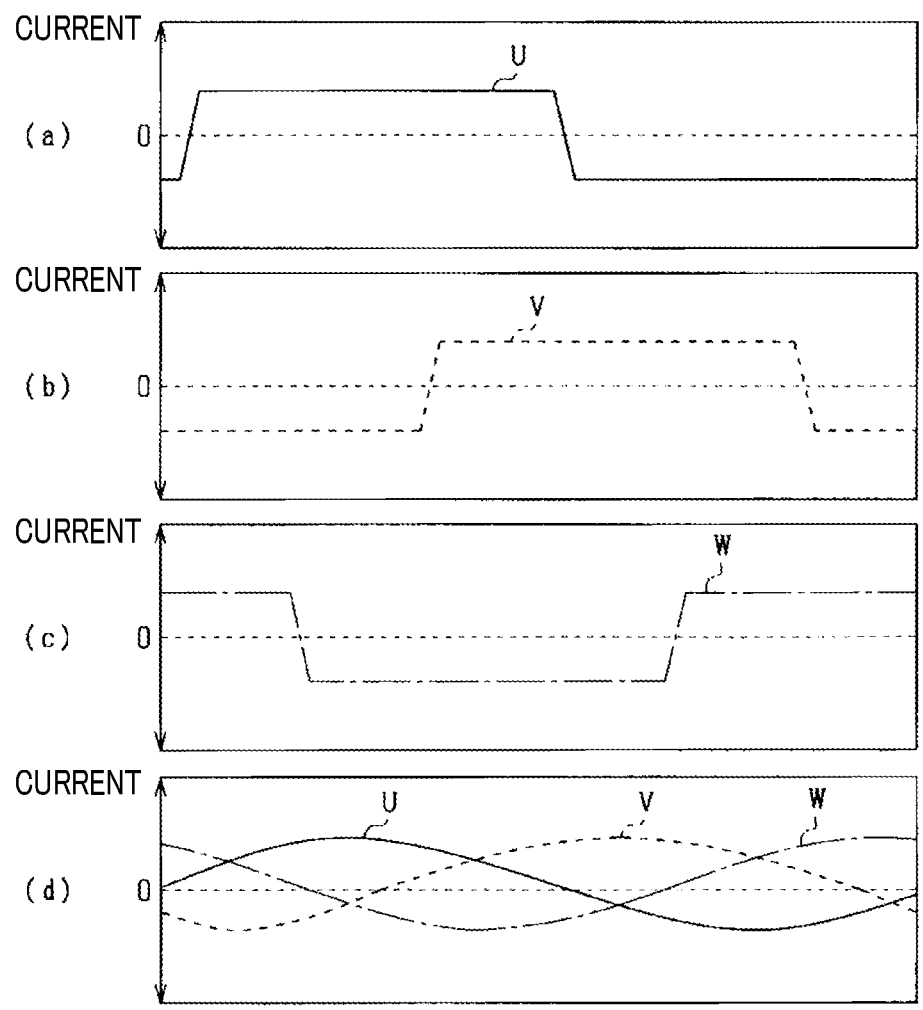
FIG. 5 is a set of diagrams in which (a) to (d) each shows a change in current with respect to time.

According to the present embodiment, at step S106, as shown in FIGS. 5(*a*) to (*c*), the control unit 60 controls the respective switches (Sp1, Sn1, Sp2, Sn2) to supply rectangular wave current to the U-phase winding 42U, the V-phase winding 42V and the W-phase winding 42W at respective phases shifted by a predetermined phase (120 degrees). At this moment, for the rectangular wave current flowing through the respective phase windings, the peak values are the same (the same waveform), the frequencies of the three phases are the same, and the mutual phase differences are 120 degrees. Note that FIG. 5(*a*) shows a rectangular wave current flowing through the U-phase winding 42U, FIG. 5(*b*) shows a rectangular wave current flowing through the V-phase winding 42V, and FIG. 5(*c*) shows a rectangular wave current flowing through the W-phase winding 42W. The current value (peak value) of the rectangular wave current is controlled to be the same as the peak value of the sinewave current which will be described later.

In the case where higher harmonic component is superposed, total amount of current for respective phases is not 0 (zero). When a star-connection is applied in which the second ends of U-phase winding 42U, the V-phase winding 42V and the W-phase winding 42W are connected at the neutral point, the total amount of current is always zero.

On the other hand, the determination result of the step S105 is affirmative, the control unit 60 executes a sinewave current control that supplies the sinewave current to the respective phases (step S107). In other words, in the case where the motor rotational speed becomes faster and a large torque is not required, the process controls the respective switches (Sp1, Sn1, Sp2, Sn2) to allow the current to flow without superposing higher harmonic component on the fundamental wave. Specifically, the process controls the respective switches (Sp1, Sn1, Sp2, Sn2) such that the total amount of current flowing through the respective phase windings becomes 0 (zero). Thus, higher harmonic component can be avoided to superpose on the fundamental wave.

According to the present embodiment, at step S107, as shown in FIG. 5(*d*), the control unit 60 controls the respective switches (Sp1, Sn1, Sp2, Sn2) to flow sinewave current through the U-phase winding 42U, the V-phase winding 42V and the W-phase winding 42W at respective phases shifted by a predetermined phase (120 degrees). In other words, symmetric three-phase current flows through respective phase windings. The symmetric three-phase current refers to a state where electromotive forces of three-phases are the same (waveforms are the same), frequencies of three-phases are the same and the phase difference between phases is 120 degrees.

At this moment, the peak value of the sinewave current is controlled to be the same as the current value of the rectangular wave. In FIG. 5(*d*), the sinewave current flowing through the U-phase winding 42U is indicated by a solid line and the sinewave current flowing through the V-phase winding 42V is indicated by a dotted line, and the sinewave current flowing through the W-phase winding 42W is indicated by a dashed line.

Then, after completing the processes at steps S106 and S107, the motor control process is terminated. Further, in the case where the determination result at step S103 is negative, the control unit 60 determines whether a regenerative drive mode is set (step S108). When the determination result is affirmative, the control unit 60 executes a power generation control (step S109). Specifically, the motor 40 is controlled to perform the regenerative driving to convert the generated power and charge the battery 30. On the other hand, when the determination result at step S108 is negative (stop mode), the control unit 60 terminates the motor control process.

Here, the threshold used at step S105 will be described. According to the present embodiment, the threshold is set to be a motor rotational speed at which the maximum value of a torque (load torque) applied to the crank shaft 10*a* when sinewave current flows through the respective phase windings matches with the load torque when rectangular wave current flows through the respective phase windings. In other words, the torque (load torque) applied to the crank shaft 10*a* changes such that the larger the engine speed (i.e. rotational speed of the motor 40), the smaller the torque applied to the crank shaft 10*a* is. In this respect, according to the present embodiment, the motor rotational speed at which the maximum value of the load torque when the sinewave current flows matches the load torque when the rectangular wave current flows is identified, and the identified motor rotational speed is set to be the threshold. The torque to be applied to the crank shaft 10*a* can be said to be a necessary torque for rotating the cranks shaft 10*a*.

Next, a load torque when starting the engine and the engine speed will be described.

Figure 6:
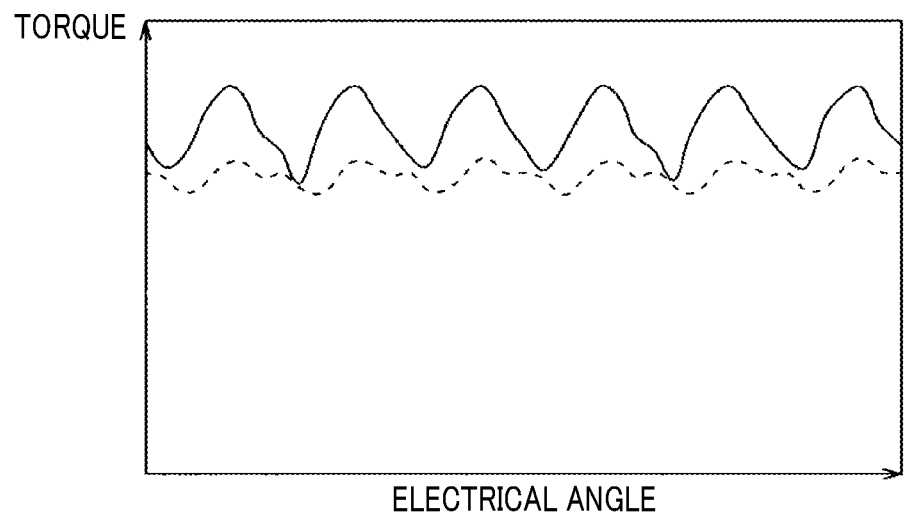
FIG. 6 is a graph showing a change in an output torque.

When an engine start request is submitted, the control unit 60 supplies the rectangular wave current to the respective phase windings, since the motor rotational speed is less than the threshold (i.e. zero). As shown in FIG. 6, the maximum value of the output torque (indicated by solid line) when the rectangular wave current flows is larger than the maximum value of the output torque (indicated by dotted line) when the sinewave current flows.

Figure 7:
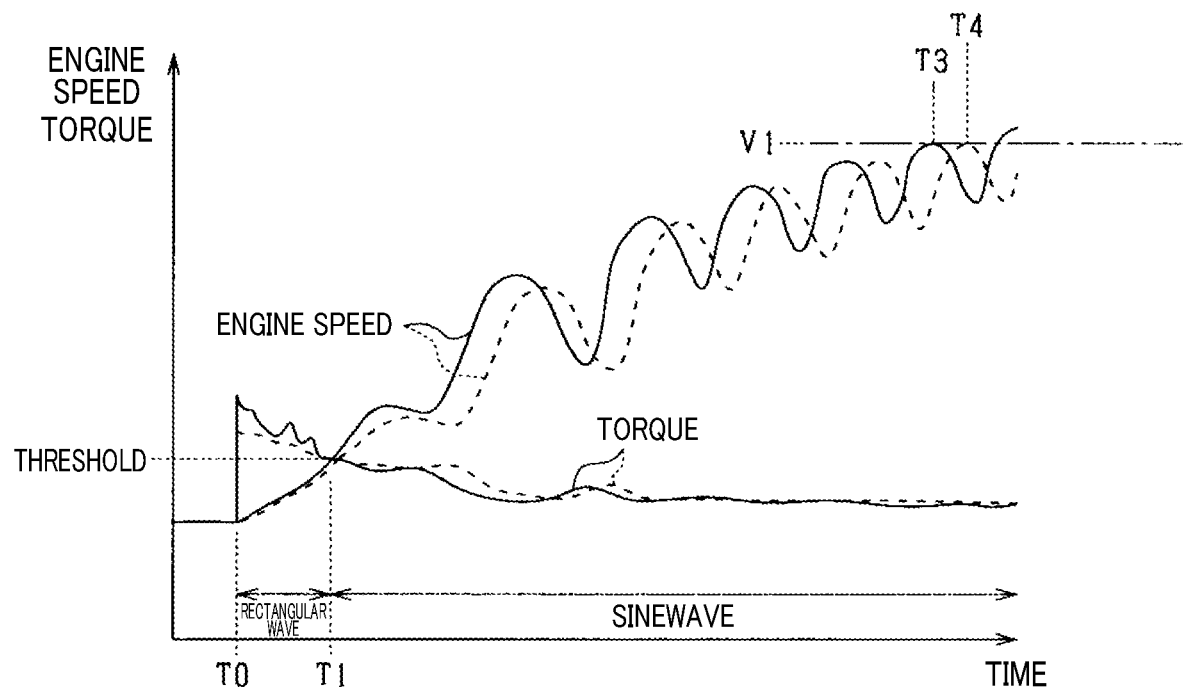
FIG. 7 is a graph showing a change in an engine speed and a load torque with respect to time.

Thus, as shown in FIG. 7, the torque applied to the crank shaft 10*a* (load torque) when the rectangular wave current flows through the respective phase windings is larger than the torque applied to the crank shaft 10*a* when the sinewave current flows through the respective phase windings. Hence, the engine speed becomes high during an early state. In FIG. 7, the torque applied to the crank shaft 10*a* and the engine speed according to the present embodiment are indicated by solid lines. Also, the torque applied to the crank shaft 10*a* and the engine speed in the case where the sinewave current continues to flow from the engine start timing (comparative example) are indicated by dotted lines.

As shown in FIG. 7, an engine starting period (time T0 to T3) in the present embodiment can be shortened compared to an engine starting period (time T0 to T4) when only the sinewave current flows. Note that the time T0 indicates a time at which the engine start request of the engine 10 is transmitted. The times T3 and T4 indicate a time at which the engine speed reaches a predetermined speed V1 and a starting process of the engine 10 is completed.

In the case where the motor rotational speed is small, torque ripple slowly occurs (pulsation period also becomes longer). Hence, in a period during which the motor rotational speed is less than the threshold from a time when the motor 40 is started to be driven, even when the rectangular wave current flows, torque ripple is not so significant. Further, eddy current is small. On the other hand, in the case where the motor rotational speed is larger than or equal to the threshold, when supplying the rectangular wave current, an amount of the torque ripple and the eddy current are expected to be larger.

For this reason, in the case where the motor rotational speed is larger than or equal to the threshold (time T1), the control unit 60 stops supplying the rectangular wave current and supplies the sinewave current to the respective phase windings, thereby controlling the motor 40. Thus, higher harmonic components are unlikely to superpose to current flowing through respective phase windings. Accordingly, torque ripple and eddy current loss can be suppressed.

The threshold is set to be a motor rotational speed at which the maximum value of the load torque when sinewave current flows through the respective phase windings matches the load torque when rectangular wave current flows through the respective phase windings. Hence, when changing the rectangular wave current control to the sinewave current control, rapid change in the load torque can be suppressed.

According to the present embodiment, excellent effects can be obtained as follows.

In the motor 40, the magnetic flux density distribution of the magnet contains higher harmonic components. Hence, total amount of current flowing through the respective windings is changed and higher harmonic components is superposed, whereby the output torque can be enhanced. That is, the starting period of the engine 10 can be shortened. Note that the torque ripple or the eddy current may become larger, depending on the motor rotational speed, when superposing the higher harmonic components. In this respect, the total amount of current flowing through the respective phase windings is changed depending on the motor rotational speed so as to adjust magnitude of the higher harmonic components which are superposed on the fundamental wave.

In more detail, when the motor rotational speed is less than the threshold, the control unit 60 sets the total amount of current flowing through the respective windings to be not zero, and superposes higher harmonic component to the fundamental wave. Thus, the output torque can be enhanced until the motor rotational speed reaches the threshold from a time when the motor is started to be driven and the starting period of the engine 100 can be shortened. Thus, in the case where the motor rotational speed is larger than or equal to the threshold, torque ripple and eddy current loss can be suppressed. As described, when starting the engine 10, the engine starting period can be shortened while suppressing the torque ripple.

The control unit 60 is configured to supply rectangular wave current to the respective phase windings when the motor rotational speed is less than the threshold. Since the rectangular wave current has relatively large higher harmonic compared to saw-tooth wave or triangle wave, the output torque can be larger than that of these saw-tooth wave or triangle wave. Hence, the starting time of the engine 10 can be appropriately shortened. On the other hand, the control unit 60 supplies sinewave current to the respective phase windings when the motor rotational speed is faster than the threshold. That is, a symmetric three-phase current is supplied to the respective windings, whereby higher harmonic component can be lowered. Accordingly, a torque ripple and the like can be appropriately suppressed.

The motor rotational speed, in which the maximum value of the load torque when sinewave current is supplied to the respective phase windings matches with the load torque when rectangular wave current is supplied to the respective phase windings, is identified to be used as a threshold. Thus, it is prevented from causing discomfort to passengers even in a case where the load torque rapidly changes when the current to be supplied is changed to the sine wave current from the rectangular wave current. Further, in the case where the load torque is larger than a load torque when the sinewave current is supplied, the starting time of the engine 10 can be shortened as short as possible in order to increase the output torque by supplying the rectangular wave current.

Other Embodiments

Note that the present disclosure is not limited to the above-described embodiments, but may be modified in various manners within a spirit of the present disclosure. Hereinafter, in the respective embodiments, the same reference numbers are applied to mutually the same portions or equivalent portions, and the explanation for the same portions is incorporated therein.

According to the above-described embodiments, when the motor 40 is required to be stopped, the control unit 60 may stop the motor 40, based on the detection result of the angle detection unit such as a resolver, at a predetermined position where the output torque becomes the maximum when a predetermined current (rectangular wave current in the first embodiment) is supplied to the respective windings in a start of driving the motor 40. Thus, as shown in FIG. 8, the load torque at a time when the motor 40 is started to be driven (time T10) is set to be larger compared to a case when the motor 40 is not stopped at the predetermined position.

Figure 8:
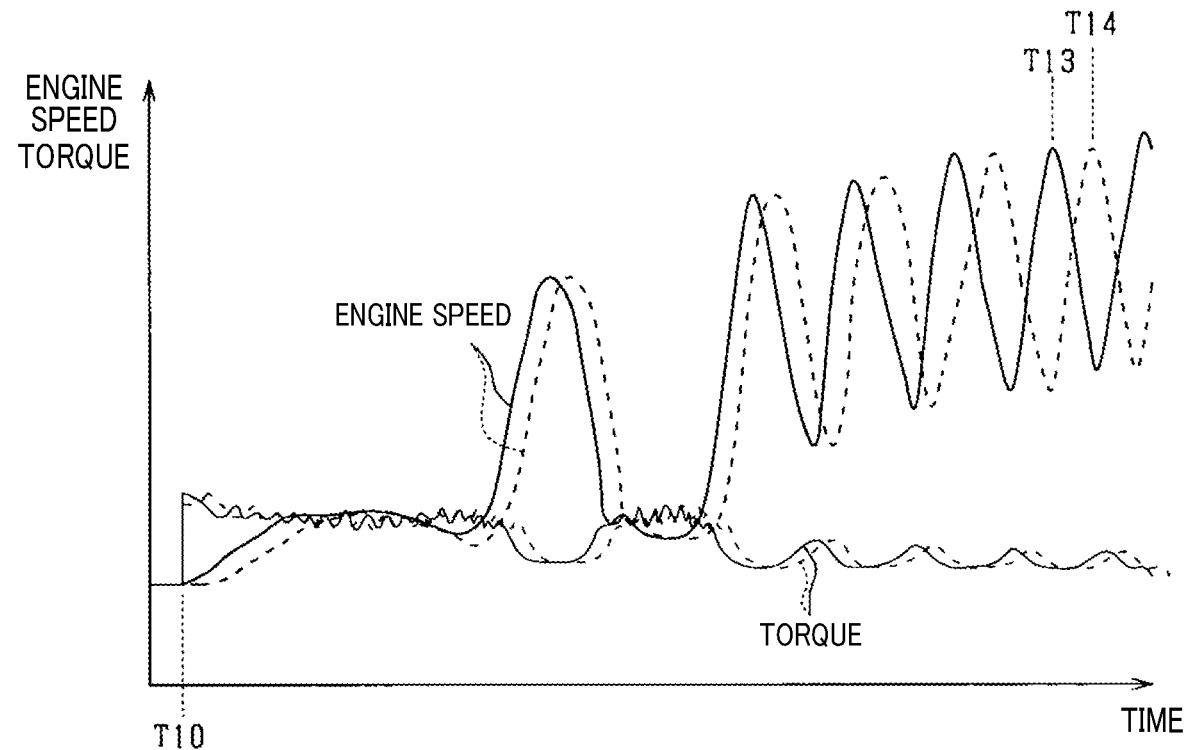
FIG. 8 is a graph showing a change in an engine speed and a load torque with respect to time in another example.

FIG. 8 shows with a solid line the engine speed and the load torque when the motor 40 is stopped at the predetermined position, and the engine speed and the load torque with a dotted line when the motor 40 is stopped at a position other than the predetermined position. Thus, compared to a case of the engine starting period (time T10 to time T14) when stopping at a position other than the predetermined position, the engine starting period (time T10 to time T13) can be shortened. Note that the position at which the output torque becomes the maximum changes depending on magnetic flux density distribution of the magnet and the current waveform flowing through the respective windings. Hence, for the predetermined position, when the motor 40 is stopped, a predetermined current may be supplied to identify the predetermined position, and the identified predetermined position may be stored in advance. Moreover, the predetermined position may be predicted based on the magnetic flux density distribution of the magnet and the current waveform supplied to the respective phase windings.

According to the present embodiment, rectangular wave current is used, but it is not necessary to use rectangular wave current. Alternatively, any voltage waveform may be used instead of using rectangular wave current. For example, a saw-tooth wave or a triangle wave can be supplied.

According to the above-described embodiments, the threshold may be arbitrarily changed. For example, the motor rotational speed at which the load torque when the rectangular wave current is supplied is larger than the load current when the sinewave current is supplied may be used as a threshold. In other words, a threshold which is smaller than the threshold in the first embodiment may be used. Thus, torque ripple and the like can be suppressed.

According to the above-described embodiments, in the case where the total amount of current flowing through the respective windings can be arbitrarily changed, circuit configurations of the first inverter circuit 51 and the second inverter circuit 52 may be changed. With a circuit configuration capable of selecting whether to superpose higher harmonics, each of the first inverter circuit 51 and the second inverter circuit 52 may be changed.

The present disclosure has been described conforming to the embodiment. However, it is realized that the present disclosure is not limited to the embodiments and the structures thereof. The present disclosure includes various modification examples and modifications of the equivalents. Moreover, various combinations and modes, or other combinations and modes which include only one element or more or less elements added to the various combinations and modes, which fall within the category of the present disclosure or within the technical scope of the present disclosure, are also embodiments of the present disclosure.

CONCLUSION

The present disclosure provides a power conversion apparatus capable of improving the motor torque when starting the engine.

The present disclosure provides a power conversion apparatus converting power from a DC power source, supplying the converted power to a rotary electric machine having a rotary shaft coupled to a crank shaft of an engine, thereby driving the rotary electric machine. The power conversion apparatus starts to drive the rotary electric machine when an engine start is requested. The power conversion apparatus includes: a first inverter circuit electrically connected to a first end side in both ends of each of phase windings which constitute the rotary electric machine, transmitting power between respective phase windings and the DC power source; a second inverter circuit electrically connected to a second end side in both ends of each of phase windings which constitute the rotary electric machine, transmitting power between respective phase windings and the DC power source; and a control unit controlling the first inverter circuit and the second inverter circuit. The control unit is configured to change a total amount of current flowing through respective phase windings depending on a rotational speed of the rotary electric machine.

In the rotary electric machine, the magnetic flux density distribution of the field magnet contains higher harmonic components. Hence, the total amount of current flowing through respective windings are changed and higher harmonic components are superposed, whereby the output torque can be enhanced. In other words, the starting period can be shortened. Note that a torque ripple or the like may become larger by superposing the higher harmonic components. For this reason, the total amount of current flowing through respective windings is adjusted depending on the rotational speed, whereby the engine starting period can be shortened while a magnitude of the higher harmonic components is appropriately adjusted.

What is claimed is:

1. A power conversion apparatus converting power from a DC power source, supplying the converted power to a rotary electric machine having a rotary shaft coupled to a crank shaft of an engine, thereby driving the rotary electric machine, the power conversion apparatus starting to drive the rotary electric machine when an engine start is requested, the power conversion apparatus comprising:
    a first inverter circuit electrically connected to a first end side of both ends of each of phase windings which constitute the rotary electric machine, transmitting power between respective phase windings and the DC power source;
    a second inverter circuit electrically connected to a second end side of both ends of each of phase windings which constitute the rotary electric machine, transmitting power between respective phase windings and the DC power source; and
    a control unit controlling the first inverter circuit and the second inverter circuit,
wherein
    the control unit is configured to change a total amount of current flowing through respective phase windings depending on a rotational speed of the rotary electric machine.

2. The power conversion apparatus according to claim 1, wherein
the control unit is configured to
set the total amount of current flowing through the respective phase windings to be not zero, when the rotational speed of the rotary electric machine is less than a threshold, and
set the total amount of current flowing through the respective phase windings to be zero, when the rotational speed of the rotary electric machine is larger than or equal to the threshold.

3. The power conversion apparatus according to claim 1, wherein
the control is configured to
supply a rectangular wave current to the respective phase windings, when the rotational speed of the rotary electric machine is less than a threshold, and
supply a sinewave current to the respective phase windings, when the rotational speed of the rotary electric machine larger than or equal to the threshold.

4. The power conversion apparatus according to claim 3, wherein
the threshold is set to be a motor rotational speed at which a maximum value of a load torque when the sinewave current is supplied to the respective phase windings matches a load torque when the rectangular wave current is supplied to the respective phase windings.

5. The power conversion apparatus according to claim 1, wherein
the control unit is configured to, when the rotary electric machine is required to be stopped, stop the rotary electric machine at a predetermined position where an output torque becomes maximum when a predetermined current is supplied to the respective windings in a start of driving the rotary electric machine, based on a detection result of an angle detection unit that detects a rotational position of a rotary shaft of the rotary electric machine.

6. The power conversion apparatus according to claim 1, wherein
the first inverter circuit and the second inverter circuit each includes a series-connected body composed of an upper arm switch and a lower arm switch for each winding; and
power is transmitted between the respective phase windings and the DC power source by switching the upper arm switch and the lower arm switch.

* * * * *